US009955356B2

(12) United States Patent
Xiong et al.

(10) Patent No.: US 9,955,356 B2
(45) Date of Patent: Apr. 24, 2018

(54) SYSTEM AND METHOD OF HANDLING UPLINK TRANSMISSION COLLISION FOR ENHANCED COVERAGE MODE UES

(71) Applicant: Intel IP Corporation, Santa Clara, CA (US)

(72) Inventors: Gang Xiong, Beaverton, OR (US); Seunghee Han, Cupertino, CA (US); Debdeep Chatterjee, Santa Clara, CA (US)

(73) Assignee: Intel IP Corporation, Santa Clara, CA (US)

( * ) Notice: Subject to any disclaimer, the term of this patent is extended or adjusted under 35 U.S.C. 154(b) by 190 days.

(21) Appl. No.: 14/718,975

(22) Filed: May 21, 2015

(65) Prior Publication Data

US 2016/0094996 A1    Mar. 31, 2016

Related U.S. Application Data (60) Provisional application No. 62/055,596, filed on Sep. 25, 2014.

(51) Int. Cl.
*H04W 4/00* (2009.01)
*H04W 16/14* (2009.01)
(Continued)

(52) U.S. Cl.
CPC .............. *H04W 16/14* (2013.01); *H04L 1/16* (2013.01); *H04L 5/00* (2013.01); *H04W 4/005* (2013.01);
(Continued)

(58) Field of Classification Search
CPC ............. H04W 4/005; H04W 72/0413; H04W 72/0446; H04W 72/0453; H04W 72/1284;
(Continued)

(56) References Cited

U.S. PATENT DOCUMENTS 9,686,064 B2 * 6/2017 He ........................ H04L 5/0048
2011/0081932 A1 * 4/2011 Astely ..................... H04L 5/001
455/509

(Continued)

FOREIGN PATENT DOCUMENTS

WO    WO-2016048522 A1    3/2016

OTHER PUBLICATIONS

"International Application Serial No. PCT/US2015/046671, International Search Report dated Jan. 8, 2016", 3 pgs.

(Continued)

*Primary Examiner* — Michael J Moore, Jr.
(74) *Attorney, Agent, or Firm* — Schwegman Lundberg & Woessner, P.A.

(57) ABSTRACT

An eNodeB (eNB), user equipment (UE) and method for operating in enhanced coverage (EC) modes are generally described. The UE may determine whether or not a physical uplink control channel (PUCCH) signal and an uplink signal allocated to different resources in a particular subframe overlap. The uplink signal may comprise another PUCCH signal or a physical uplink shared channel (PUSCH) signal. The PUCCH signals may comprise a scheduling request or acknowledgement response/retransmission request. The UE may select one of the overlapping signals and transmit the selected signal on a resource allocated to the other signal instead of on a resource allocated to the one of the overlapping signals. The other signal may or may not be transmitted dependent on whether it is a PUCCH or PUSCH signal.

24 Claims, 5 Drawing Sheets

(51) Int. Cl.
   *H04L 1/16* (2006.01)
   *H04W 72/04* (2009.01)
   *H04L 5/00* (2006.01)
   *H04W 72/12* (2009.01)
(52) U.S. Cl.
   CPC ... *H04W 72/0413* (2013.01); *H04W 72/0446* (2013.01); *H04W 72/0453* (2013.01); *H04W 72/1284* (2013.01)
(58) Field of Classification Search
   CPC . H04W 74/0833; H04W 16/14; H04W 24/02; H04W 72/0493; H04W 72/1263; H04L 5/0055; H04L 5/0053; H04L 5/0094; H04L 5/0057
   See application file for complete search history.

(56) References Cited

U.S. PATENT DOCUMENTS

| | | | |
|---|---|---|---|
| 2012/0008556 A1 | 1/2012 | Noh et al. | |
| 2013/0301486 A1* | 11/2013 | Kishiyama | H04L 5/0007 370/277 |
| 2014/0050185 A1* | 2/2014 | Hooli | H04L 5/0053 370/329 |
| 2014/0098761 A1 | 4/2014 | Lee et al. | |
| 2014/0169325 A1 | 6/2014 | Ratasuk et al. | |
| 2015/0215080 A1* | 7/2015 | Kim | H04L 1/1858 370/329 |
| 2015/0245347 A1* | 8/2015 | Yi | H04W 72/1289 370/280 |
| 2016/0006529 A1* | 1/2016 | Yi | H04J 11/0056 370/329 |
| 2016/0262182 A1* | 9/2016 | Yang | H04W 72/04 |
| 2016/0353440 A1* | 12/2016 | Lee | H04W 4/005 |
| 2016/0381674 A1* | 12/2016 | Kim | H04B 7/26 370/329 |
| 2017/0013565 A1* | 1/2017 | Pelletier | H04W 52/146 |

OTHER PUBLICATIONS

"International Application Serial No. PCT/US2015/046671, Written Opinion dated Jan. 8, 2016", 9 pgs.

Intel, Corporation, "Coverage Improvement for (E)PDCCH and PUCCH", R1-140116, 3GPP TSG-RAN WG1 #76, Prague, Czech Republic, (Feb. 1, 2014), 1,2 pgs.

LG, Electronics, et al., "UL channel transmission for MTC coverage enhancement", R1-140308, 3GPP TSG RAN WG1 #76, Prague, Czech Republic, (Feb. 1, 2014), pp. 1-4.

* cited by examiner

SYSTEM AND METHOD OF HANDLING UPLINK TRANSMISSION COLLISION FOR ENHANCED COVERAGE MODE UES

PRIORITY CLAIM

This application claims the benefit of priority to U.S. Provisional Patent Application Ser. No. 62/055,596, filed Sep. 25, 2014, and entitled "SYSTEM AND METHOD ASSOCIATED WITH HANDLING UPLINK TRANSMISSION COLLISION FOR MTC UES IN ENHANCED COVERAGE MODE," which is incorporated herein by reference in its entirety.

TECHNICAL FIELD

Embodiments pertain to wireless communications. Some embodiments relate to cellular communication networks including Third Generation Partnership Project Long Term Evolution (3GPP LTE) networks and LTE advanced (LTE-A) networks as well as $4^{th}$ generation (4G) networks and $5^{th}$ generation (5G) networks. Some embodiments relate to enhanced coverage communication.

BACKGROUND

With the increase in different types of devices communicating over networks to servers and other computing devices, usage of third generation long term evolution (3GPP LTE) systems has increased. In particular, both typical user equipment (UE) such as cell phones and Machine Type Communications (MTC) UEs currently use 3GPP LTE system. MTC UEs pose a particular challenge due to low energy consumption involved in such communication. In particular, MTC UEs are less computationally powerful and have less power for communication, and many are configured to remain essentially indefinitely in a single location. Examples of such MTC UEs include sensors (e.g., sensing environmental conditions) or microcontrollers in appliances or vending machines. In some circumstances, the MTC UEs may be located in areas where there is little to no coverage, such as inside buildings, or in isolated geographical areas. Unfortunately, in a number of cases, MTC UEs do not have sufficient power for communications with the nearest serving base station (enhanced Node B (eNB)) with which they communicate. Similar problems may exist for non-stationary wireless UEs, such as mobile phones, that are disposed in a network area with poor coverage, i.e., one in which the link budget is several dB below typical network values.

Transmission power may not be able to be increased either by a UE or eNB in situations in which UEs are in such areas. To achieve coverage extension and obtain additional dB in link budget, signals may be repeatedly transmitted from the transmitting device (either the UE or eNB) over an extended period across multiple subframes and physical channels to accumulate energy at the receiving device (the other of the UE or eNB). However, when data is retransmitted in this manner, collisions may occur between different channels. It would be desirable to design transmissions to minimize or altogether avoid such collisions.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
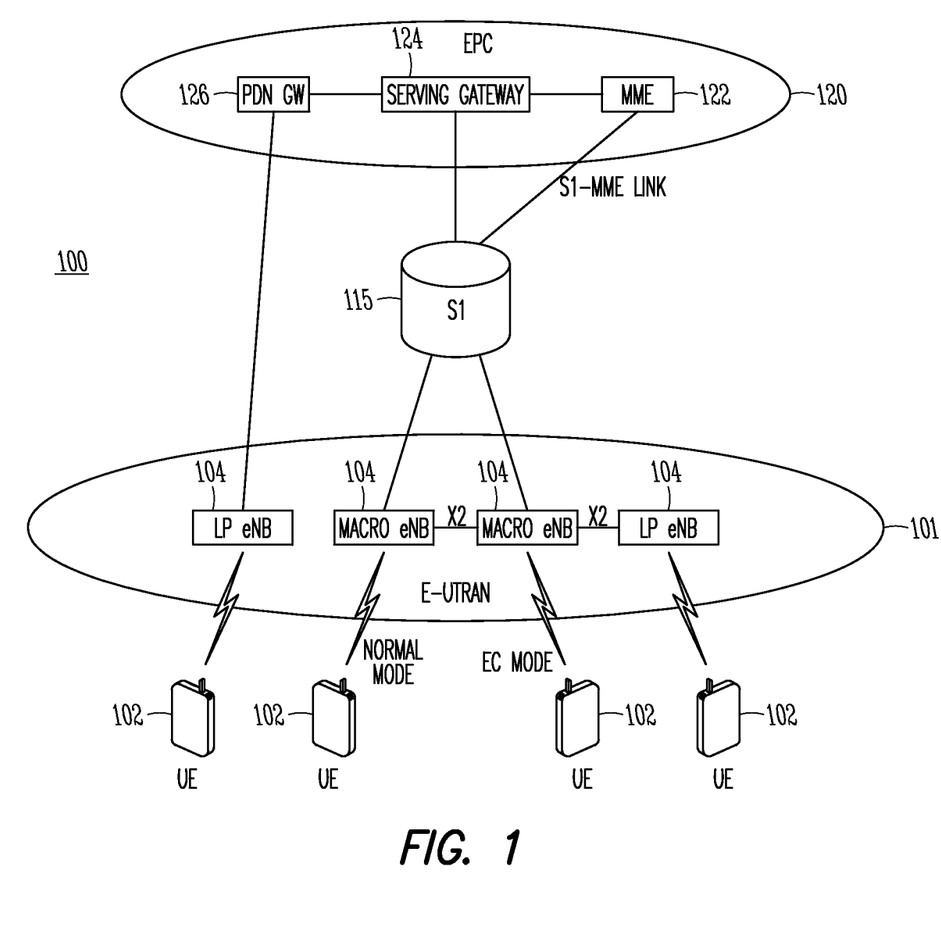
FIG. 1 is a functional diagram of a 3GPP network in accordance with some embodiments.

FIG. 1 is a functional diagram of a 3GPP network in accordance with some embodiments. The network may comprise a radio access network (RAN) (e.g., as depicted, the E-UTRAN or evolved universal terrestrial radio access network) 100 and the core network 120 (e.g., shown as an evolved packet core (EPC)) coupled together through an S1 interface 115. For convenience and brevity sake, only a portion of the core network 120, as well as the RAN 100, is shown.

The core network 120 includes mobility management entity (MME) 122, serving gateway (serving GW) 124, and packet data network gateway (PDN GW) 126. The RAN 100 includes Evolved Node-B's (eNBs) 104 (which may operate as base stations) for communicating with UE 102. The eNBs 104 may include macro eNBs and low power (LP) eNBs.

The MME is similar in function to the control plane of legacy Serving GPRS Support Nodes (SGSN). The MME manages mobility aspects in access such as gateway selection and tracking area list management. The serving GW 124 terminates the interface toward the RAN 100, and routes traffic packets (such as data packets or voice packets) between the RAN 100 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates a SGi interface toward the packet data network (PDN). The PDN GW 126 routes traffic packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

The eNBs 104 (macro and micro) terminate the air interface protocol and may be the first point of contact for a UE 102. The eNBs 104 may communicate both with UEs 102 in a normal coverage mode and UEs 104 in one or more enhanced coverage modes. In some embodiments, an eNB 104 may fulfill various logical functions for the RAN 100 including but not limited to RNC (radio network controller functions) such as radio bearer management, uplink and downlink dynamic radio resource management and traffic packet scheduling, and mobility management. In accordance with embodiments, UEs 102 may be configured to communicate OFDM communication signals with an eNB 104 over a multicarrier communication channel in accordance with an OFDMA communication technique. The OFDM signals may comprise a plurality of orthogonal subcarriers. Other technologies may also be used, such as Non-Orthogonal Multiple Access (NOMA), Code Division Multiple Access (CDMA), and Orthogonal Frequency-Division Multiple Access (OFDMA).

The S1 interface 115 is the interface that separates the RAN 100 and the EPC 120. It is split into two parts: the S1-U, which carries traffic packets between the eNBs 104 and the serving GW 124, and the S1-MME, which is a signaling interface between the eNBs 104 and the MME 122.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell.

Communication over an LTE network may be split up into 10 ms frames, each of which may contain ten 1 ms subframes. Each subframe may, in turn, contain two slots of 0.5 ms. Each subframe may be used for uplink (UL) communications from the UE to the eNB or downlink (DL) communications from the eNB to the UE. The eNB may schedule uplink and downlink transmissions over a variety of frequency bands. The allocation of resources in subframes used in one frequency band and may differ from those in another frequency band. Each slot of the subframe may contain 6-7 symbols. The subframe may contain 12 subcarriers. A downlink resource grid may be used for downlink transmissions from an eNB to a UE, while an uplink resource grid may be used for uplink transmissions from a UE to an eNB or from a UE to another UE. The resource grid may be a time-frequency grid, which is the physical resource in each slot. The smallest time-frequency unit in a resource grid may be denoted as a resource element (RE). Each column and each row of the resource grid may correspond to one OFDM symbol and one OFDM subcarrier, respectively. The resource grid may contain resource blocks (RBs) that describe the mapping of physical channels to resource elements and physical RBs (PRBs). A PRB may be the smallest unit of resources that can be allocated to a UE. A resource block may be 180 kHz wide in frequency and 1 slot long in time. In frequency, resource blocks may be either 12×15 kHz subcarriers or 24×7.5 kHz subcarriers wide. For most channels and signals, 12 subcarriers may be used per resource block, dependent on the system bandwidth. The duration of the resource grid in the time domain may correspond to one subframe or two resource blocks. Each resource grid may comprise 12 (subcarriers)*14 (symbols) =168 resource elements.

Figure 2:
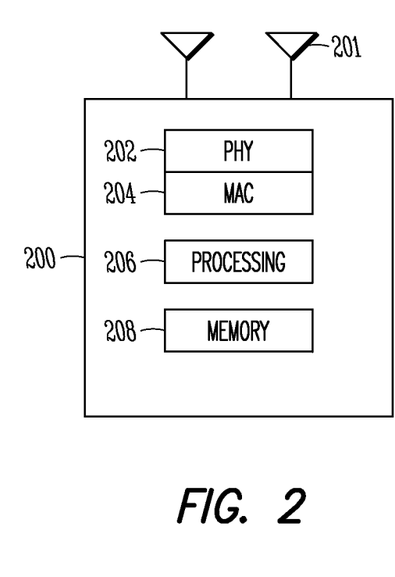
FIG. 2 is a block diagram of a 3GPP device in accordance with some embodiments.

FIG. 2 is a functional diagram of a 3GPP device in accordance with some embodiments. The device may be a UE or eNB, for example. In some embodiments, the eNB may be a stationary non-mobile device. The 3GPP device 200 may include physical layer circuitry 202 for transmitting and receiving signals using one or more antennas 201. The 3GPP device 200 may also include medium access control layer (MAC) circuitry 204 for controlling access to the wireless medium. The 3GPP device 200 may also include processing circuitry 206 and memory 208 arranged to perform the operations described herein.

In some embodiments, mobile devices or other devices described herein may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the mobile device or other device can be a UE 102 or eNB 104 configured to operate in accordance with 3GPP standards. In some embodiments, the mobile device or other device may be configured to operate according to other protocols or standards, including IEEE 802.11 or other IEEE standards. In some embodiments, the mobile device or other device may include one or more of a keyboard, a display, a non-volatile memory port, multiple antennas, a graphics processor, an application processor, speakers, and other mobile device elements. The display may be an LCD screen including a touch screen.

The antennas 201 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 201 may be effectively separated to take advantage of spatial diversity and the different channel characteristics that may result.

Although the 3GPP device 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

The term "machine readable medium" may include a single medium or multiple media (e.g., a centralized or distributed database, and/or associated caches and servers) configured to store one or more instructions. The term "machine readable medium" may include any medium that is capable of storing, encoding, or carrying instructions for execution by the 3GPPP device 200 and that cause it to perform any one or more of the techniques of the present disclosure, or that is capable of storing, encoding or carrying data structures used by or associated with such instructions. The term "transmission medium" shall be taken to include any intangible medium that is capable of storing, encoding or carrying instructions for execution, and includes digital or analog communications signals or other intangible medium to facilitate communication of such software.

As indicated above, different types of UEs may use an enhanced coverage mode in which information is repeatedly transmitted to permit successful decoding of the signal at the receiver. The UEs may include a normal UE (e.g., a smartphone or the like), a machine-to-machine (M2M) UE or a stationary wireless UE (i.e., a UE that remains indefinitely in a single location) using MTC. At least some of the UEs or the serving eNB are unable to increase transmission power in an enhanced coverage area, either because the UE is intrinsically power limited or limited by the eNB, e.g., to reduce interference. In this case, the UE may enter an enhanced coverage mode when situated in locations in which the link budget for the nearest serving base station is worse than a typical link budget value in the network and additional link budget is to be obtained without increasing transmission power.

To increase signal power at the receiver without increasing the transmission power, the same packet data may be repeatedly transmitted by the transmitter. The transmitter may be either of the UE (uplink communications) or eNB (downlink communications), while the receiver may be the other of the UE (downlink communications) or eNB (uplink communications). The UE may determine whether additional link budget is desired, as well as how much additional link budget is desired. In some embodiments, the additional link budget may include multiple discrete levels, e.g., up to about 5 dB, up to about 10 dB, up to about 15 dB and up to about 20 dB. In response to determining how much additional link budget is desired, the UE may implement a different enhanced coverage mode. In some embodiments, different enhanced coverage modes may be available dependent on the desired amount of additional link budget.

Typically UEs may communicate over an operating bandwidth of 20 MHz, however, to reduce cost and power consumption, the operating bandwidth of MTC UEs may be reduced, e.g., to 1.4 MHz, for both control and data channels. This may permit an MTC resource region of limited resources (e.g., in frequency) to be used in communications between the MTC UEs and the eNB.

Independent of the operating bandwidth, there may be several different physical channels that are conveyed using resource blocks. These physical channels may include a physical downlink control channel (PDCCH) and physical downlink shared channel (PDSCH) in a downlink transmission and a physical uplink control channel (PUCCH) and physical uplink shared channel (PUSCH) in an uplink transmission. Each subframe may be partitioned into the PDCCH and PDSCH or PUCCH and PUSCH. The PDCCH may normally occupy the first two symbols of each subframe and carry, among other things, information about the transport format and resource allocations related to the PDCCH, as well as H-ARQ information related to the uplink or downlink shared channel. The PDSCH may carry user data and higher layer signaling to a UE or eNB and occupy the remainder of the subframe. The PUSCH may be shared by UEs to transmit data to the network. The scheduling is controlled by the eNB. Typically, downlink scheduling (assigning control and shared channel resource blocks to UEs within a cell) may be performed at the eNB based on channel quality information provided from the UEs to the eNB, and then the downlink resource assignment information may be sent to each UE on the PDCCH used for (assigned to) the UE. The PDCCH may contain downlink control information (DCI) in one of a number of formats that tell the UE how to find and decode data, transmitted on PDSCH in the same subframe, from the resource grid. The DCI format may provide details such as number of resource blocks, resource allocation type, modulation scheme, transport block, redundancy version, coding rate etc. Each DCI format may have a cyclic redundancy code (CRC) and be scrambled with a Radio Network Temporary Identifier (RNTI) that identifies the target UE for which the PDSCH is intended. Use of the UE-specific RNTI may limit decoding of the DCI format (and hence the corresponding PDSCH) to only the intended UE.

The PUCCH may carry information including Uplink Control Information (UCI), similar to the DCI of the PDCCH. The PUCCH may be mapped to a control channel resource defined by a code and two resource blocks, consecutive in time, with hopping potentially at the boundary between adjacent slots. The PUCCH may take several different formats, with the UCI containing information dependent on the format. Specifically, the PUCCH may contain a scheduling request (SR), acknowledgement responses/retransmission requests (ACK/NACK) or a Channel Quality Indication (CQI)/Channel State Information (CSI). The CQI/CSI may indicate the current channel conditions and, if MIMO transmission is used by the UE, may include MIMO-related feedback.

In order to prevent the loss of transport blocks, the Hybrid Automatic Repeat Request (HARM) scheme may be used. When an eNB sends PDSCH data in a downlink transmission to the UE, the data packets may be sent together with indicators in a PDCCH in the same subframe that inform the UE about the scheduling of the PDSCH, including the transmission time and other characteristics of the transmitted data. For each PDSCH codeword that the UE receives, the UE may respond with an ACK when the codeword is successfully decoded, or a NACK when the codeword is not successfully decoded. The eNB may expect the ACK/NACK a predetermined number of subframes from the subframe in which the PDSCH data is sent. Upon receiving a NACK from the UE, the eNB may retransmit the transport block or skip the retransmission. The ACK/NACK may be transmitted by the UE 4 subframes after a signal is received from the eNB. Depending on the number of codewords present, a HARQ-ACK may contain 1 or 2 information bits (formats 1a and 1b, respectively). The HARQ-ACK bits may then be processed, as per the PUCCH.

A scheduling request may permit the UE to request resources to transmit on the PUSCH. In some embodiments, no information bits are used to request resources to transmit on the PUSCH. The eNB may know, however, the timing of when to expect a scheduling request from each UE within the cell. Thus, if PUCCH energy is detected, the eNB may identify it as a scheduling request from the corresponding UE. PUCCH formats 1, 1a, and 1b may use four SC-FDMA symbols per slot and may be modulated respectfully using no modulation scheme, binary phase shift keying (BPSK) and quadrature phase shift keying (QPSK). If a normal cyclic prefix is used, the remaining 3 symbols may be used for a PUCCH demodulation reference signal (DM-RS). If a sounding reference signal (SRS) overlaps the PUCCH symbols, only three symbols may be used as the PUCCH symbol in the second slot of the subframe. DM-RS symbols may be used by the eNB to perform channel estimation and allow for coherent demodulation of the received signal. The DM-RS symbols may be essentially pilot symbols in LTE, used for channel estimation for the demodulation of the data symbols of the subframe.

The 3GPP specification in TS 36.211 indicates that a UE may not transmit uplink colliding control or data signals within a subframe. The 3GPP specification also supports dedicated scheduling requests. In other words, each UE in a cell may be assigned a specific resource index mapping providing a resource that can be used every $n^{th}$ frame to transmit a scheduling request as well as other control or data signals. In such an embodiment, as the eNB may schedule the UEs separately, the collision probability between uplink transmissions of UEs in normal mode may be minimal.

However, UEs in enhanced coverage mode may transmit uplink control or data signals in consecutive subframes to enable detection of the signal by the eNB. While this may not lead to a problem for collisions between UEs, collisions may occur for a particular UE in enhanced coverage mode. In particular, due to the repetition, a PUCCH (control) signal allocated to one set of physical resource blocks may overlap temporally with another PUCCH signal or a PUSCH signal allocated to a different set of physical resource blocks. For example, a scheduling request repetition may overlap with an ACK/NACK repetition in the same subframe and a PUSCH repetition with data transmission or CSI reporting overlaps with an ACK/NACK repetition in the same subframe. In this case, a predetermined set of relationships may be defined to handle overlap between the repetitions to enable the enhanced coverage mode UE, once the overlap is determined, to select only one of the overlapped signals for transmission. The selected signal is transmitted not on the set of physical resource blocks associated with the selected signal but on the set of physical resource blocks associated with the other signal. This enables the UE to maintain a low CM single-carrier property of uplink transmission.

FIGS. 3A-3D illustrate uplink subframes in accordance with some embodiments. FIGS. 3A-3D show overlapping uplink transmissions in an enhanced mode UE as shown in FIG. 1 or 2, for example a MTC UE. As shown, three sets of UL subframes A, B, C in which only one set of subframes contains an overlap between different uplink signals. FIGS. 3A-3D variously include starting subframes for a scheduling request $SF_{SR}$, a HARQ ACK/NACK $SF_{AN}$, and repetition levels (number of repetitions) for the scheduling request repetition $RL_{SR}$ and a HARQ ACK/NACK repetition $RL_{AN}$. In some embodiments, the repetition levels (number of repetitions) may be the same between the different signals and/or different UEs. In some embodiments, the repetition levels (number of repetitions) may be different dependent on the particular signal being transmitted, the particular UE transmitting the signal (e.g., different UEs may have different extended coverage levels) and/or the signal environment (e.g., whether the CSI indicates that the channel quality has changed, indicating that a different number of repetitions may be used to obtain the same link budget). In each of these figures, the scheduling request and HARQ ACK/NACK are transmitted on same or different sets of PRBs. The SR and ACK/NACK may be transmitted in the same PRB, but with different resources (e.g., different spreading code) to avoid collision. The number of PRBs used for a particular PUCCH transmission shown in FIGS. 3A-3D may vary and be between 1-4 PRBs depending on the UCI format indicated by the eNB. The PRBs used may be limited if the UE is an MTC UE, in which the communication spectrum between the UE and the eNB may be limited (e.g., 1.4 MHz) with respect to the bandwidth spectrum over which the eNB is able to communicate. Although shown as being transmitted in a single constant set of resources, in some embodiments, frequency hopping may occur between slots. In this case, the various signals may be transmitted on different resources in different slots. The resources used by the UE during each transmission, whether or not frequency hopping is used may be predetermined by the standard or assigned by the eNB for the UE, e.g., using RRC signaling.

Figure 3A:
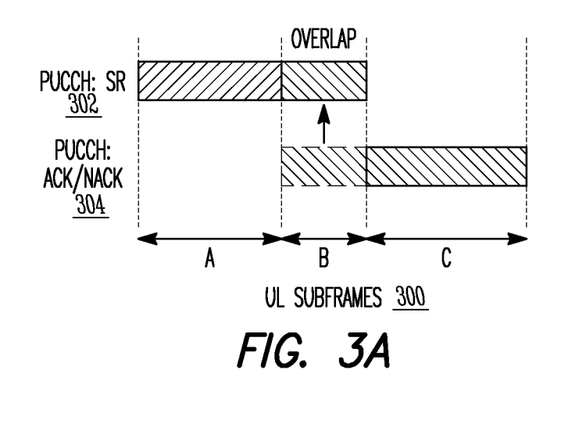
FIGS. 3A-3D illustrate uplink subframes in accordance with some embodiments.

In the UL subframes 300 of FIG. 3A, for example, the first set of UL subframes A encompasses the region from the first subframe in which the scheduling request 302 may be first transmitted $SF_{SR}$ to the subframe immediately prior to the starting HARQ ACK/NACK 304 subframe $SF_{AN}-1$ ($SF_{SR}$ to $SF_{AN}-1$). This is to say that in the first set of subframes A, the scheduling request 302 may be transmitted over continuous subframes while the HARQ ACK/NACK 304 may not be transmitted. In some embodiments, in each of these subframes, the scheduling request 302 may be repeated over the same set of resources. In FIG. 3A, the repetition levels may be the same or different between the scheduling request 302 and the HARQ ACK/NACK 304.

The second set of UL subframes B encompasses the region from the first subframe in which the HARQ ACK/NACK 304 is to be transmitted $SF_{AN}$ to the last subframe in which scheduling request 302 is to be transmitted $RL_{SR}-1$ ($SF_{AN}$ to $SF_{SR}+RL_{SR}-1$). In the second set of subframes B, both the scheduling request 302 and the HARQ ACK/NACK 304 may be scheduled to be transmitted on the different resources, and thereby overlap temporally.

The third set of UL subframes C encompasses the region from the first subframe after the last subframe in which scheduling request 302 may be transmitted $SF_{SR}+RL_{SR}$ to the last subframe in which the HARQ ACK/NACK 304 may be transmitted $RL_{AN}-1$ ($SF_{SR}+RL_{SR}$ to $SF_{AN}+RL_{AN}-1$). Thus, in the third set of subframes C, the HARQ ACK/NACK 304 may be transmitted over continuous subframes on the same set of resources while the scheduling request may not be transmitted. Thus, the HARQ ACK/NACK repetition starts after the starting subframe of the scheduling request repetition and completes after the last subframe of the scheduling request repetition.

While the first set of UL subframes A and the third set of UL subframes C present no issue in terms of overlap as only one of PUCCH signals, the scheduling request 302 and the HARQ ACK/NACK 304, may be transmitted on the respective resources, in the second set of UL subframes B both are to be transmitted. To overcome this issue, the HARQ ACK/NACK 304 may in this region be transmitted in the resource allocated to the scheduling request 302 instead of the resource associated with the HARQ ACK/NACK 304. Although the eNB may expect a HARQ ACK/NACK on the resource allocated to the HARQ ACK/NACK, in these subframes for a UE in enhanced mode, the eNB may first check the resource for scheduling requests to determine whether any PUCCH signal is present in the resources for scheduling requests. If a PUCCH signal is present in the resource for scheduling requests, the eNB may receive the PUCCH signal instead of tuning to the resource for the HARQ ACK/NACK to attempt to receive a HARQ ACK/NACK. The value the scheduling request may take may be either be 0 (no signal transmitted on the assigned resource) or 1 (a signal is present in the assigned resource). The value the HARQ ACK/NACK may take may be +1 or −1. If energy is detected in the resource assigned to the scheduling request, independent of what the energy may be, the eNB may initially identify the energy as a scheduling request from the UE. In some embodiments, only after successfully decoding the signal in the resource for scheduling requests may the eNB determine that the information is a HARQ ACK/NACK. In other embodiments, the eNB may retain the information that a HARQ ACK/NACK is scheduled to be transmitted by the UE in the second set of subframes B and thus that any transmission on the resource of the scheduling request is the HARQ ACK/NACK that also indicates the presence of a scheduling request. Thus, the UE may drop the scheduling request transmission and instead transmit the HARQ ACK/NACK in the resource of the scheduling request as the eNB may be able to interpret the presence of the HARQ ACK/NACK in the resource of the scheduling request as a scheduling request. Note that if no scheduling request is indicated in the resource associated with the scheduling request, no overlap occurs. Thus, the UE may transmit only one of the overlapping scheduling request 302 and the HARQ ACK/NACK 304 signals in the subframe in which the signals overlap and transmit either but not both of the scheduling request 302 and the HARQ ACK/NACK 304 signals in subframes in which one of the scheduling request 302 and the HARQ ACK/NACK 304 signals do not overlap with the other of the scheduling request 302 and the HARQ ACK/NACK 304 signals.

Figure 3B:
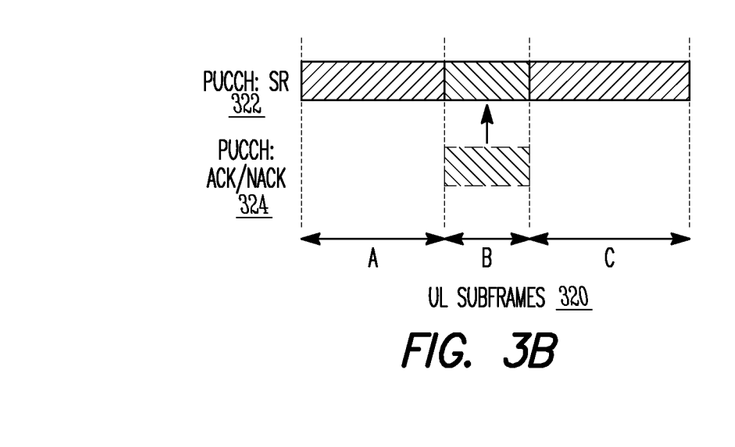

FIG. 3B shows UL subframes 320 in which the first set of UL subframes A encompasses the region from the first subframe in which the scheduling request 322 may be first transmitted $SF_{SR}$ to the subframe immediately prior to the starting HARQ ACK/NACK 324 subframe $SF_{AN}-1$ ($SF_{SR}$ to $SF_{AN}-1$). As above, the scheduling request 322 may be transmitted over continuous subframes over the same set of PRBs while the HARQ ACK/NACK 324 may not be transmitted.

The second set of UL subframes B encompasses the region from the first subframe in which the HARQ ACK/NACK 324 is to be transmitted $SF_{AN}$ to the last subframe in which the HARQ ACK/NACK 324 may be transmitted $RL_{AN}-1$ ($SF_{AN}$ to $SF_{AN}+RL_{AN}-1$). As above, the second set of subframes B, both the scheduling request 322 and the HARQ ACK/NACK 324 may temporally overlap on the different resource. In FIG. 3B, the repetition levels may be different between the scheduling request 322 and the HARQ ACK/NACK 324, with the repetition level of the scheduling request 322 being greater than the repetition level of the HARQ ACK/NACK 324.

The third set of UL subframes C encompasses the region from the first subframe after the last subframe in which the HARQ ACK/NACK 324 may be transmitted $SF_{SR}+RL_{SR}$ to the last subframe in which the scheduling request 322 may be transmitted $RL_{SR}-1$ ($SF_{AN}+RL_{AN}$ to $SF_{SR}+RL_{SR}-1$). Thus, in the third set of subframes C, the HARQ ACK/NACK 324 may no longer be transmitted and the scheduling request 322 may continue to be transmitted.

In a manner similar to the above, the HARQ ACK/NACK 324 may, in the second set of subframes B, be transmitted in the resource associated with the scheduling request 322 instead of the resource associated with the HARQ ACK/NACK 324. Thus, in this example, transmission of the scheduling request 322 may surround transmission of the HARQ ACK/NACK 324 on the resource of the scheduling request 322, with transmission of the HARQ ACK/NACK 324 replacing transmission of the scheduling request 322 in the second set of subframes B. The eNB, as above, may initially identify the energy as a scheduling request from the UE. Only after successfully decoding the signal in the resource for scheduling requests may the eNB determine that the information is a HARQ ACK/NACK.

Figure 3C:
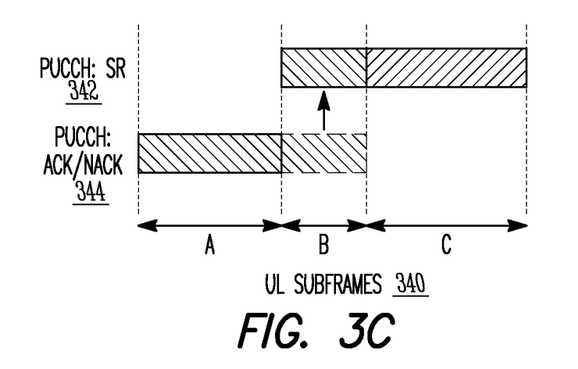

In the UL subframes 340 of FIG. 3C, the first set of UL subframes A may encompass the region from the first subframe in which the HARQ ACK/NACK 344 subframe may be first transmitted $SF_{AN}$ to the subframe immediately prior to starting the scheduling request 342 $SF_{SR}-1$ ($SF_{AN}$ to $SF_{SR}-1$). In this region, the HARQ ACK/NACK 344 may be transmitted over continuous subframes over the same set of resources while the scheduling request 342 may not be transmitted. In FIG. 3C, the repetition levels may be the same or different between the scheduling request 342 and the HARQ ACK/NACK 344.

The second set of UL subframes B encompasses the region from the first subframe in which the scheduling request 342 is to be transmitted $RL_{SR}$ to the last subframe in which the HARQ ACK/NACK 344 is to be transmitted $SF_{AN}-1$ ($SF_{SR}$ to $SF_{AN}+RL_{AN}-1$). In the second set of subframes B, both the scheduling request 342 and the HARQ ACK/NACK 344 may be scheduled to be transmitted on the different resources, and thereby overlap temporally.

The third set of UL subframes C encompasses the region from the first subframe after the last subframe in which the HARQ ACK/NACK 344 may be transmitted ($SF_{AN}+RL_{AN}$) to the last subframe in which the scheduling request 342 may be transmitted $RL_{SR}-1$ ($SF_{AN}+RL_{AN}$ to $SF_{SR}+RL_{SR}-1$). Thus, in the third set of subframes C, the scheduling request 342 may be transmitted over continuous subframes on the same set of resources while the HARQ ACK/NACK 344 may not be transmitted. Thus, the scheduling request repetition starts after the starting subframe of the HARQ ACK/NACK repetition and completes after the last subframe of the HARQ ACK/NACK repetition.

Similar to the above, the HARQ ACK/NACK 344 may, in the second set of subframes B, be transmitted in the resources associated with the scheduling request 342 instead of the resources associated with the HARQ ACK/NACK 344. Thus, the UE may drop the scheduling request transmission and instead transmit the HARQ ACK/NACK in the resource of the scheduling request as the eNB may be able to interpret the presence of the HARQ ACK/NACK in the resource of the scheduling request as a scheduling request.

Figure 3D:
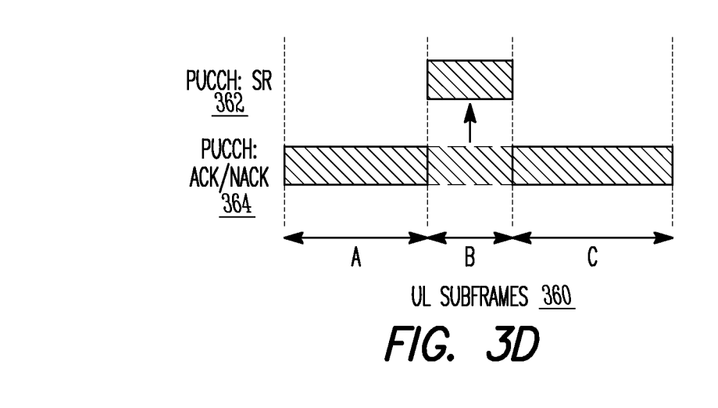

FIG. 3D shows UL subframes 360 in which the first set of UL subframes A encompasses the region from the first subframe in which the HARQ ACK/NACK 364 may be first transmitted $SF_{AN}$ to the subframe immediately prior to starting the scheduling request 362 $SF_{SR}-1$ ($SF_{AN}$ to $SF_{SR}-1$). As above, the HARQ ACK/NACK 364 may be transmitted over continuous subframes over the same set of resources while the scheduling request 362 may not be transmitted. In FIG. 3D, the repetition levels may be different between the scheduling request 362 and the HARQ ACK/NACK 364, with the repetition level of the HARQ ACK/NACK 364 being greater than the repetition level of the scheduling request 362.

The second set of UL subframes B encompasses the region from the first subframe in which the scheduling request 362 may be transmitted $SF_{SR}$ to the last subframe in which the scheduling request 362 may be transmitted $RL_{SR}-1$ ($SF_{SR}$ to $SF_{SR}+RL_{SR}-1$). As above, the second set of subframes B, both the scheduling request 362 and the HARQ ACK/NACK 364 may temporally overlap on the different resources.

The third set of UL subframes C encompasses the region from the first subframe after the last subframe in which the scheduling request 362 may be transmitted $SF_{SR}+RL_{SR}$ to the last subframe in which the HARQ ACK/NACK 364 may be transmitted $RL_{AN}-1$ ($SF_{SR}+RL_{SR}$ to $SF_{AN}+RL_{AN}-1$). Thus, in the third set of subframes C, the scheduling request 362 may no longer be transmitted and the HARQ ACK/NACK 364 may continue to be transmitted.

In a manner similar to the above, the HARQ ACK/NACK 364 may, in the second set of subframes B, be transmitted in the resource associated with the scheduling request 362 instead of the resource associated with the HARQ ACK/NACK 364. Thus, in this example, transmission of the HARQ ACK/NACK 364 may surround transmission of the scheduling request 362 on the PRBs of the scheduling request 362, with transmission of the HARQ ACK/NACK 364 replacing transmission of the scheduling request 362 in the second set of subframes B. In this case, however, no separate scheduling request 362 is transmitted.

FIGS. 4A-4D illustrate uplink subframes in accordance with some embodiments. FIGS. 4A-4D show overlapping uplink transmissions in an enhanced mode UE as shown in FIG. 1 or 2, for example a MTC UE. Similar to FIGS. 3A-3D, three sets of UL subframes A, B, C in which only one set of subframes contains an overlap between different uplink signals. FIGS. 4A-4D variously include starting subframes for a PUSCH data $SF_{DATA}$, a HARQ ACK/NACK $SF_{AN}$, and repetition levels (number of repetitions) for the PUSCH data $RL_{DATA}$ and HARQ ACK/NACK $RL_{AN}$. In some embodiments, the repetition levels (number of repetitions) may be the same between the different signals and/or different UEs. In some embodiments, the repetition levels (number of repetitions) may be different dependent on the particular signal being transmitted, the particular UE transmitting the signal (e.g., different UEs may have different extended coverage levels) and/or the signal environment (e.g., whether the CSI indicates that the channel quality has changed, indicating that a different number of repetitions may be used to obtain the same link budget). In each of these figures, the PUSCH data and HARQ ACK/NACK are transmitted on different sets of resources. The resources used may be limited if the UE is an MTC UE, in which the communication spectrum between the UE and the eNB may be limited (e.g., 1.4 MHz) with respect to the bandwidth spectrum over which the eNB is able to communicate. Although shown as being transmitted in a single constant set of resources, in some embodiments, frequency hopping may occur between slots. In this case, the various signals may be transmitted on different resources in different slots. The resources used by the UE during each transmission, whether or not frequency hopping is used may be predetermined by the standard or assigned by the eNB for the UE, e.g., using RRC signaling.

Figure 4A:
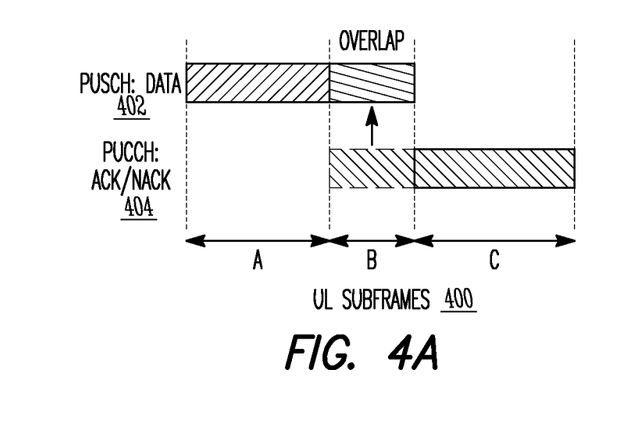
FIGS. 4A-4D illustrate uplink subframes in accordance with some embodiments.

In the UL subframes 400 of FIG. 4A, for example, the first set of UL subframes A encompasses the region from the first subframe in which the PUSCH data 402 may be first transmitted $SF_{DATA}$ to the subframe immediately prior to the starting HARQ ACK/NACK 404 subframe $SF_{AN}-1$ ($SF_{DATA}$ to $SF_{AN}-1$). This is to say that in the first set of subframes A, the PUSCH data 402 may be transmitted over continuous subframes while the HARQ ACK/NACK 404 may not be transmitted. In some embodiments, in each of these subframes, the PUSCH data 402 may be repeated over the same set of resources.

The second set of UL subframes B encompasses the region from the first subframe in which the HARQ ACK/NACK 404 is to be transmitted $SF_{AN}$ to the last subframe in which PUSCH data 402 is to be transmitted $RL_{DATA}-1$ ($SF_{AN}$ to $SF_{DATA}+RL_{DATA}-1$). In the second set of subframes B, both the PUSCH data 402 and the HARQ ACK/NACK 404 may be scheduled to be transmitted on the different resources, and thereby overlap temporally.

The third set of UL subframes C encompasses the region from the first subframe after the last subframe in which PUSCH data 402 may be transmitted $SF_{DATA}+RL_{DATA}$ to the last subframe in which the HARQ ACK/NACK 404 may be transmitted $RL_{AN}-1$ ($SF_{DATA}+RL_{DATA}$ to $SF_{AN}+RL_{AN}-1$). Thus, in the third set of subframes C, the HARQ ACK/NACK 404 may be transmitted over continuous subframes on the same set of resources while the PUSCH data may not be transmitted. Thus, the HARQ ACK/NACK repetition starts after the starting subframe of the PUSCH data repetition and completes after the last subframe of the PUSCH data repetition.

To overcome the overlap in the second set of UL subframes B, the HARQ ACK/NACK 404 may in this region be transmitted in the resources allocated to the PUSCH data 402 instead of the PRBs associated with the HARQ ACK/NACK 404. Unlike the embodiments shown in FIGS. 3A-3D, however, the PUSCH data 402 may still be transmitted on the resources allocated to the PUSCH data 402. The HARQ ACK/NACK 404 may be encoded and punctured into data symbols forming the PUSCH data 402, pursuant to the process prescribed in Section 5.2.2.6 of 3GPP TS 36.212. In this process, some of the data symbols of the PUSCH data 402 may be replaced by the ACK/NACK coded symbols. Section 5.2.2.8 of 3GPP TS 36.212 specifies which data symbols may (and which may not) be replaced by ACK/NACK symbols. In some embodiments, the data symbols that are punctured may be adjacent to the DM-RS symbols of the PUSCH data 402. In some embodiments, while the PUSCH data may contain CSI reporting, the HARQ ACK/NACK 404 symbols may puncture the data symbols adjacent to the DM-RS symbols of the PUSCH data 402 and be transmitted along with the PUSCH data 402 on the resources associated with the PUSCH data 402.

In some embodiments, the eNB may determine that the information in the PUSCH data 402 includes a HARQ ACK/NACK 404 only after successfully decoding the signal in the resources for the PUSCH data 402. In other embodiments, the eNB may retain the information that a HARQ ACK/NACK is scheduled to be transmitted by the UE in the second set of subframes B and thus that any transmission on the resources of the PUSCH data 402 contains the HARQ ACK/NACK 404. Thus, the UE may drop transmission of the HARQ ACK/NACK 404 on the resources associated with the HARQ ACK/NACK 404 and instead transmit the HARQ ACK/NACK 404 in the resources of the PUSCH data 402 along with the PUSCH data 402. Thus, the UE may transmit only one of the separate overlapping PUSCH data 402 and the HARQ ACK/NACK 404 signals in the subframe in which the signals overlap.

Figure 4B:
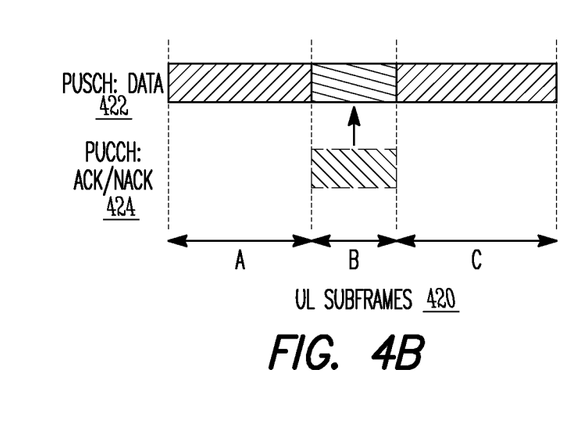

FIG. 4B shows UL subframes 420 in which the first set of UL subframes A encompasses the region from the first subframe in which the PUSCH data 422 may be first transmitted $SF_{DATA}$ to the subframe immediately prior to the starting HARQ ACK/NACK 424 subframe $SF_{AN}-1$ ($SF_{DATA}$ to $SF_{AN}-1$). As above, the PUSCH data 422 may be transmitted over continuous subframes over the same set of resources while the HARQ ACK/NACK 424 may not be transmitted.

The second set of UL subframes B encompasses the region from the first subframe in which the HARQ ACK/NACK 424 is to be transmitted $SF_{AN}$ to the last subframe in which the HARQ ACK/NACK 424 may be transmitted $RL_{AN}-1$ ($SF_{AN}$ to $SF_{AN}+RL_{AN}-1$). As above, the second set of subframes B, both the PUSCH data 422 and the HARQ ACK/NACK 424 may temporally overlap on the different resources.

The third set of UL subframes C encompasses the region from the first subframe after the last subframe in which the HARQ ACK/NACK 424 may be transmitted $SF_{DATA}+RL_{DATA}$ to the last subframe in which the PUSCH data 422 may be transmitted $RL_{DATA}-1$ ($SF_{AN}+RL_{AN}$ to $SF_{DATA}+RL_{DATA}-1$). Thus, in the third set of subframes C, the HARQ ACK/NACK 424 may no longer be transmitted and the PUSCH data 422 may continue to be transmitted.

In a manner similar to the above, the HARQ ACK/NACK 424 may, in the second set of subframes B, be transmitted in the resources associated with the PUSCH data 422 instead of the resources associated with the HARQ ACK/NACK 424. The HARQ ACK/NACK 424 may be embedded into the PUSCH data 422. The HARQ ACK/NACK 424 may be encoded and punctured into data symbols forming the PUSCH data 422. In this example, transmission of the PUSCH data 422 may surround transmission of the HARQ ACK/NACK 424 on the resources of the PUSCH data 422, with transmission of the HARQ ACK/NACK 424 replacing transmission of the PUSCH data 422 in the second set of subframes B.

Figure 4C:
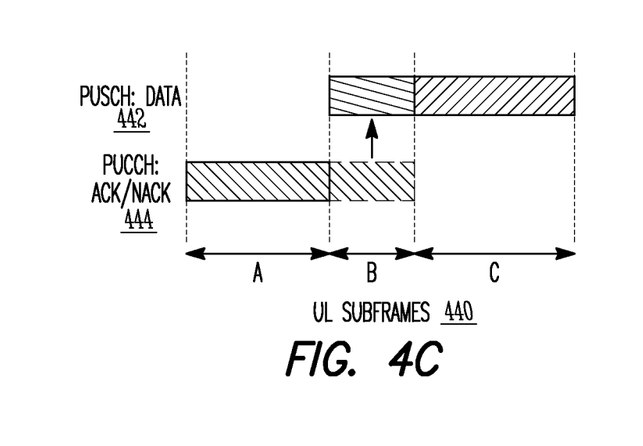

In the UL subframes 440 of FIG. 4C, the first set of UL subframes A encompasses the region from the first subframe in which the HARQ ACK/NACK 444 subframe may be first transmitted $SF_{AN}$ to the subframe immediately prior to starting the PUSCH data 442 $SF_{DATA}-1$ ($SF_{AN}$ to $SF_{DATA}-1$). In this region, the HARQ ACK/NACK 444 may be transmitted over continuous subframes over the same set of resources while the PUSCH data 442 may not be transmitted.

The second set of UL subframes B encompasses the region from the first subframe in which the PUSCH data 442 is to be transmitted $RL_{DATA}$ to the last subframe in which the HARQ ACK/NACK 444 is to be transmitted $SF_{AN}-1$ ($SF_{DATA}$ to $SF_{AN}+RL_{AN}-1$). In the second set of subframes B, both the PUSCH data 442 and the HARQ ACK/NACK 444 may be scheduled to be transmitted on the different resources, and thereby overlap temporally.

The third set of UL subframes C encompasses the region from the first subframe after the last subframe in which the HARQ ACK/NACK 444 may be transmitted ($SF_{AN}+RL_{AN}$) to the last subframe in which the PUSCH data 442 may be transmitted $RL_{DATA}-1$ ($SF_{AN}+RL_{AN}$ to $SF_{DATA}+RL_{DATA}-1$). Thus, in the third set of subframes C, the PUSCH data 442 may be transmitted over continuous subframes on the same set of resources while the HARQ ACK/NACK 444 may not be transmitted. Thus, the PUSCH data repetition starts after the starting subframe of the HARQ ACK/NACK repetition and completes after the last subframe of the HARQ ACK/NACK repetition.

Similar to the above, the HARQ ACK/NACK 444 may, in the second set of subframes B, be transmitted in the resources associated with the PUSCH data 442 instead of the resources associated with the HARQ ACK/NACK 444. The HARQ ACK/NACK 444 may be embedded into the PUSCH data 442. The HARQ ACK/NACK 444 may be encoded and punctured into data symbols forming the PUSCH data 442. Thus, the UE may drop the PUSCH data transmission and instead transmit the HARQ ACK/NACK in the resources of the PUSCH data as the eNB may be able to interpret the presence of the HARQ ACK/NACK in the resources of the PUSCH data as a PUSCH data.

Figure 4D:
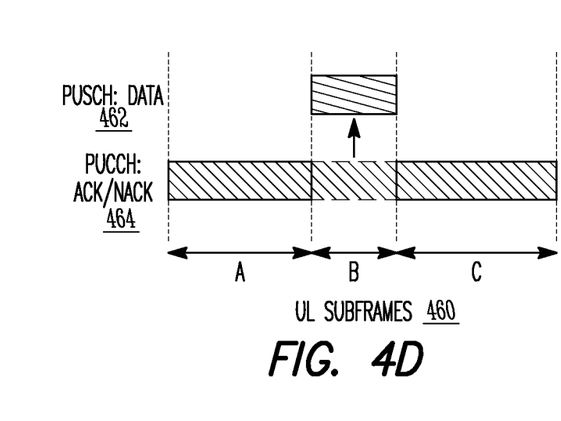

FIG. 4D shows UL subframes 460 in which the first set of UL subframes A encompasses the region from the first subframe in which the HARQ ACK/NACK 464 may be first transmitted $SF_{AN}$ to the subframe immediately prior to starting the PUSCH data 462 $SF_{DATA}-1$ ($SF_{AN}$ to $SF_{DATA}-1$). As above, the HARQ ACK/NACK 464 may be transmitted over continuous subframes over the same set of resources while the PUSCH data 462 may not be transmitted.

The second set of UL subframes B encompasses the region from the first subframe in which the PUSCH data 462 may be transmitted $SF_{DATA}$ to the last subframe in which the PUSCH data 462 may be transmitted $RL_{DATA}-1$ ($SF_{DATA}$ to $SF_{DATA}+RL_{DATA}-1$). As above, the second set of subframes B, both the PUSCH data 462 and the HARQ ACK/NACK 464 may temporally overlap on the different resources.

The third set of UL subframes C encompasses the region from the first subframe after the last subframe in which the PUSCH data 462 may be transmitted $SF_{DATA}+RL_{DATA}$ to the last subframe in which the HARQ ACK/NACK 464 may be transmitted $RL_{AN}-1$ ($SF_{DATA}+RL_{DATA}$ to $SF_{AN}+RL_{AN}-1$). Thus, in the third set of subframes C, the PUSCH data 462 may no longer be transmitted and the HARQ ACK/NACK 464 may continue to be transmitted.

In a manner similar to the above, the HARQ ACK/NACK 464 may, in the second set of subframes B, be transmitted in the resources associated with the PUSCH data 462 instead of the resources associated with the HARQ ACK/NACK 464. The HARQ ACK/NACK 464 may be encoded and punctured into data symbols forming the PUSCH data 462. Thus, in this example, transmission of the HARQ ACK/NACK 464 may surround transmission of the PUSCH data 462 on the resources of the PUSCH data 462, with transmission of the HARQ ACK/NACK 464 replacing transmission of the PUSCH data 462 in the second set of subframes B.

Figure 5:
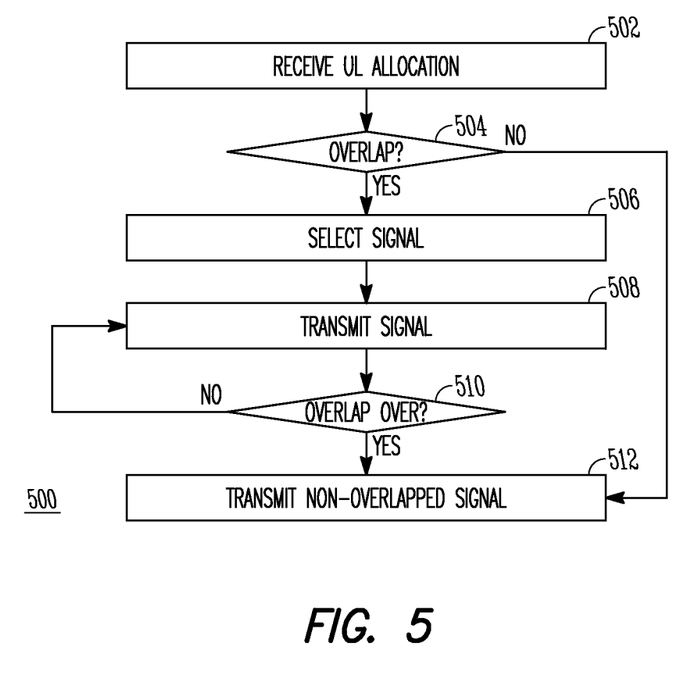
FIG. 5 illustrates a flowchart of a method of uplink collision handling for an enhanced coverage mode UE in accordance with some embodiments.

FIG. 5 illustrates a flowchart of a method of uplink collision handling for an enhanced coverage mode UE in accordance with some embodiments. In the method 500, the UE may receive an allocation of resources for various PUCCH and PUSCH signals at operation 502. The allocation may be predetermined via specification or may be provided to the UE, e.g., using RRC or other control signaling. The UE may be a normal UE having a bandwidth of, say 20 MHz, or an MTC UE whose bandwidth is limited to 1.4 MHz. Other limited bandwidths supported by LTE, such as 3 MHz, 5 MHz, 10 MHz or 15 MHz, or bandwidths less than 1.4 MHz, may be used.

In operation 504, the UE may determine whether it is to transmit multiple uplink signals to the eNB and whether the signals overlap temporally. The signals may be transmitted in the same subframe but be assigned different resources. The signals may be different PUCCH signals or a PUCCH signal and a PUSCH signal. In particular, the UE may determine whether the PUCCH signals include a scheduling request and a HARQ ACK/NACK or a HARQ ACK/NACK and PUSCH data (perhaps with CSI data).

Once the UE determines that overlap is to occur, the UE may select only one of the uplink signals to transmit in the subframe at operation 506. The selection may be limited by the 3GPP specification to not permit multiple uplink signals to be transmitted to the eNB simultaneously. The selection and manner of determining transmission may be dependent on the type of uplink signals in the same subframe. For example, as a scheduling request may generally be indicated by the presence of a HARQ ACK/NACK, transmission of a separate scheduling request may be superfluous. Similarly, as a HARQ ACK/NACK may be incorporated in a PUSCH data signal, the HARQ ACK/NACK transmission of a separate HARQ ACK/NACK may be superfluous.

At operation 508, the selected uplink signal is transmitted by the UE to the eNB. As above, if at operation 504 overlap between a scheduling request and HARQ ACK/NACK has been determined, the HARQ ACK/NACK may be transmitted rather than the scheduling request. However, the HARQ ACK/NACK may be transmitted in the resource of the scheduling request rather than that of the HARQ ACK/NACK, thereby permitting the HARQ ACK/NACK to act as a scheduling request to the eNB. If at operation 504 overlap between PUSCH data and HARQ ACK/NACK has been determined, the PUSCH data may be transmitted rather than the HARQ ACK/NACK. However, the HARQ ACK/NACK may be transmitted in the resource of the PUSCH data by puncturing into data symbols around the DM-RS of the PUSCH data. Thus, the UE may transmit both the PUSCH data and the HARQ ACK/NACK in the resource of the PUSCH data while refraining from transmitting the HARQ ACK/NACK in the resource of the HARQ ACK/NACK.

The UE may then determine whether the overlap is over at operation 510. For a UE in normal mode, only one PUCCH or PUSCH signal may be transmitted to convey a particular piece of information. However, for a UE in enhanced mode, multiple PUCCH or PUSCH signals that are the same may be transmitted in consecutive subframes to enable the eNB to build up a link budget sufficient to permit the eNB to decode the signal. Thus, so the UE may continue to transmit only the selected signal as long as overlap continues to occur between the resources allocated for the different signals.

At operation 512, the UE may determine that the overlap has ended—i.e., that only one of the signals is to be transmitted on the appropriate resource. In some embodiments, the signal may continue to be transmitted from previous subframes for a predetermined number of repetitions dependent on the enhancement level of the UE (e.g., whether an increase of 5 dB, 10 dB, 20 dB is desired to achieve the predetermined link budget). In some embodiments, the signal may be transmitted from even though it has not been transmitted on previous subframes. This permits the UE to maintain the low cubic metric (CM) single-carrier property of the transmitted signal, which is repeated across multiple subframes for various physical channels to permit the energy of the signal to be accumulated at the receiver, while avoiding potential collisions due to the repetitions when the UE is in an enhanced coverage mode and has a limited link budget.

Various examples of the disclosure are provided below. These examples are not intended to in any way limit the disclosure herein. In Example 1, a UE comprises a transceiver configured to communicate with an eNB and processing circuitry. The processing circuitry is configured to: configure the UE to be in a normal or an enhanced coverage (EC) mode; when the UE is in the EC mode determine whether or not a physical uplink control channel (PUCCH) signal and an uplink signal (another PUCCH signal or a physical uplink shared channel (PUSCH) signal) allocated to different physical resource blocks (resources) in a particular subframe overlap to form overlapping signals; select one of the overlapping signals for transmission during the particular subframe; and configure the transceiver to transmit the one of the overlapping signals on a resource allocated to another of the overlapping signals instead of on a resource allocated to the one of the overlapping signals.

In Example 2, the subject matter of Example 1 can optionally include either or both of the processing circuitry being configured to configure the transceiver to transmit at least one of the overlapping signals in another subframe in which the at least one of the overlapping signals does not overlap with the other of the overlapping signals.

In Example 3, the subject matter of one or any combination of Examples 1-2 can optionally include the processing circuitry being configured to configure the transceiver to transmit at least one of the overlapping signals in consecutive subframes, including the particular subframe.

In Example 4, the subject matter of Example 3 can optionally include the processing circuitry being configured to configure the transceiver to transmit the other of the overlapping signals in subframes surrounding the one of the overlapping signals.

In Example 5, the subject matter of one or any combination of Examples 1-4 can optionally include the processing circuitry being configured to configure the transceiver to refrain from transmitting the other of the overlapping signals on the resource allocated to the other of the overlapping signals.

In Example 6, the subject matter of Example 5 can optionally include the one of the overlapping signals comprising an Acknowledgment/Non-acknowledgment (ACK/NACK) and the other of the overlapping signals comprises a Scheduling Request (SR).

In Example 7, the subject matter of one or any combination of Examples 1-6 can optionally include the processing circuitry being configured to configure the transceiver to transmit the other of the overlapping signals on the resource allocated to the other of the overlapping signals.

In Example 8, the subject matter of Example 7 can optionally include the one of the overlapping signals comprising an Acknowledgment/Non-acknowledgment (ACK/NACK) and the other of the overlapping signals comprises the PUSCH signal, the PUSCH signal comprising data symbols surrounding demodulation reference (DM-RS) symbols, and the processing circuitry being further configured to puncture the data symbols adjacent to the PUSCH DM-RS symbols and inserting the ACK/NACK.

In Example 9, the subject matter of one or any combination of Examples 1-8 can optionally include the UE being a Machine Type Communications (MTC) UE restricted to communicate with the eNB over a limited set of subbands of a bandwidth spectrum over which the eNB is able to communicate, and at least one of the PUCCH signal and uplink signal being repeated across multiple subframes to form the overlapping signals.

In Example 10, the subject matter of one or any combination of Examples 1-9 can optionally include an antenna configured to transmit and receive communications between the transceiver and the eNB.

In Example 11, an apparatus of an eNB comprises processing circuitry configured to: determine which of one of a normal coverage mode and an enhanced coverage (EC) mode the UE is in; configure the transceiver to receive a plurality of signals from the UE over a same predetermined set of physical resource blocks (PRBs) in different subframes, the plurality of signals in the subframes being expected to provide the same information in response to determining that the UE is in the EC mode; decode the plurality of signals; detect that the signals in at least one of the subframes differs from the signals in another of the subframes; and determine that the signals in the at least one of the subframes comprise an overlapping signal of a different set of PRBs that has been received on the predetermined set of PRBs instead of being received on the different set of PRBs.

In Example 12, the subject matter of Example 11 can optionally include the plurality of signals comprising one of a physical uplink control channel (PUCCH) signal and a physical uplink shared channel (PUSCH) signal and the signals in the at least one of the subframes comprise another PUCCH signal.

In Example 13, the subject matter of one or any combination of Examples 11-12 can optionally include the processing circuitry being configured to configure a transceiver to receive the plurality of signals in consecutive subframes, including the at least one of the subframes.

In Example 14, the subject matter of Example 13 can optionally include the processing circuitry being further configured to configure the transceiver to receive the signals in the at least one of the subframes in subframes surrounding the at least one of the subframes.

In Example 15, the subject matter of one or any combination of Examples 11-14 can optionally include the signals in the at least one of the subframes are received in the at least one of the subframes instead of the signals in the other of the subframes.

In Example 16, the subject matter of Example 15 can optionally include the signals in the at least one of the subframes comprising an Acknowledgment/Non-acknowledgment (ACK/NACK) and the signals in the other of the subframes comprises a Scheduling Request (SR).

In Example 17, the subject matter of one or any combination of Examples 11-16 can optionally include the signals in the at least one of the subframes being received in the at least one of the subframes in addition to the signals in the other of the subframes.

In Example 18, the subject matter of Example 17 can optionally include the signals in the at least one of the subframes comprising an Acknowledgment/Non-acknowledgment (ACK/NACK) and the signals in the other of the subframes comprises a PUSCH signal, the PUSCH signal comprising data symbols punctured adjacent to demodulation reference (DM-RS) symbols in which the ACK/NACK is inserted.

In Example 19, the subject matter of one or any combination of Examples 11-18 can optionally include the UE being a Machine Type Communications (MTC) UE restricted to communicate with the eNB over a limited set of subbands of a bandwidth spectrum over which the eNB is able to communicate, and at least one of the plurality of signals being repeated across multiple subframes.

In Example 20, a non-transitory computer-readable storage medium that stores instructions for execution by one or more processors of UE to configure the UE to communicate with an eNB. The one or more processors configure the UE to operate in an enhanced coverage (EC) mode; determine that a physical uplink control channel (PUCCH) signal allocated to a first physical resource block (PRB) and an uplink signal allocated to a second PRB, different from the first PRB, overlap in a particular subframe, the uplink signal comprising one of another PUCCH signal and a physical uplink shared channel (PUSCH) signal; and transmit the PUCCH signal on the second PRB rather than on the first PRB in the particular subframe.

In Example 21, the subject matter of Example 20 can optionally include the PUCCH signal comprising an Acknowledgment/Non-acknowledgment (ACK/NACK), the uplink signal comprises a Scheduling Request (SR), and the ACK/NACK is transmitted instead of the SR.

In Example 22, the subject matter of one or any combination of Examples 20-21 can optionally include the PUCCH signal comprising an Acknowledgment/Non-acknowledgment (ACK/NACK), the uplink signal comprises a PUSCH signal, and data symbols of the PUSCH signal are punctured adjacent to demodulation reference (DM-RS) symbols and the ACK/NACK is inserted.

In Example 23, the subject matter of Example 22 can optionally include the PUSCH comprising channel state information (CSI).

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus of a user equipment (UE) comprising:
an interface configured to communicate with an enhanced Node B (eNB) in a network; and
processing circuitry configured to:
    configure the UE to be in one of a normal coverage mode or an enhanced coverage (EC) mode;
    determine, in response to the UE being in the EC mode, whether repetitions of different overlapping signals are scheduled on a physical uplink control channel (PUCCH) in a particular subframe;
    select, in response to the overlapping signals being determined, one of the overlapping signals for transmission during the particular subframe;
    encode, for transmission through the interface, the one of the overlapping signals on the PUCCH during the particular subframe; and
    decode a resource grant from the eNB to transmit on a physical uplink control channel (PUSCH) in response to transmission of a Scheduling Request (SR), energy detected in a resource of the PUCCH assigned to the SR initially identified by the eNB as the SR.

2. The apparatus of claim 1, wherein the processing circuitry is further configured to:
encode, for transmission through the interface, at least one of the overlapping signals in another subframe in which the at least one of the overlapping signals does not overlap with the other of the overlapping signals.

3. The apparatus of claim 1, wherein the processing circuitry is further configured to:
encode, for transmission through the interface, at least one of the overlapping signals in consecutive subframes, including the particular subframe.

4. The apparatus of claim 3, wherein the processing circuitry is further configured to:
encode, for transmission through the interface, the other of the overlapping signals in subframes surrounding the one of the overlapping signals.

5. The apparatus of claim 1, wherein the processing circuitry is further configured to:
refrain from transmission of the other of the overlapping signals on the resource allocated to the other of the overlapping signals.

6. The apparatus of claim 5, wherein:
the one of the overlapping signals comprises an Acknowledgment/Non-acknowledgment (ACK/NACK) and the other of the overlapping signals comprises a Scheduling Request (SR).

7. The apparatus of claim 1, wherein:
the UE is a Machine Type Communications (MTC) UE restricted to communicate with the eNB over a limited set of subbands of a bandwidth spectrum over which the eNB is able to communicate, and
at least one of the PUCCH signal and uplink signal is repeated across multiple subframes to form the overlapping signals.

8. The apparatus of claim 1, further comprising an antenna configured to transmit and receive communications between the transceiver and the eNB.

9. An apparatus of an enhanced Node B (eNB) comprising:
an interface configured to communicate with a user equipment (UE) in a network; and
processing circuitry configured to:
    determine which of one of a normal coverage mode and an enhanced coverage (EC) mode the UE is in;
    after a determination that the UE is in the EC mode, decode a plurality of signals from the UE received via the interface over a physical uplink control channel (PUCCH) in different subframes, the plurality of signals in the subframes being expected to be repetitions of the same signal in response to determining that the UE is in the EC mode, wherein when energy is detected in a resource of the PUCCH assigned to a Scheduling Request (SR) from the UE, the energy is initially identified by the processing circuitry as the SR;
    detect that the signals in at least one of the subframes differs from the signals in another of the subframes; and
    determine that the signals in the at least one of the subframes comprise one overlapping signal of a set of overlapping signals scheduled on the PUCCH.

10. The apparatus of claim 9, wherein the processing circuitry is further configured to:
decode the plurality of signals in consecutive subframes, including the at least one of the subframes.

11. The apparatus of claim 10, wherein the processing circuitry is further configured to:
decode the signals in the at least one of the subframes in subframes surrounding the at least one of the subframes.

12. The apparatus of claim 9, wherein:
the signals in the at least one of the subframes are received in the at least one of the subframes instead of the signals in the other of the subframes.

13. The apparatus of claim 12, wherein:
the signals in the at least one of the subframes comprises an Acknowledgment/Non-acknowledgment (ACK/NACK) and the signals in the other of the subframes comprises the SR.

14. The apparatus of claim 9, wherein:
the UE is a Machine Type Communications (MTC) UE restricted to communicate with the eNB over a limited set of subbands of a bandwidth spectrum over which the eNB is able to communicate.

15. The apparatus of claim 9, wherein the processing circuitry is further configured to:
  decode the energy to determine that the information is an Acknowledgment/Non-acknowledgment (ACK/NACK) rather than the scheduling request.

16. The apparatus of claim 9, wherein the processing circuitry is further configured to:
  retain information that an Acknowledgment/Non-acknowledgment (ACK/NACK) is scheduled to be transmitted by the UE and determine that a transmission on the resource of the PUCCH is the ACK/NACK that also indicates the presence of the scheduling request.

17. A non-transitory computer-readable storage medium that stores instructions for execution by one or more processors of an enhanced Node B (eNB) to configure the eNB to communicate with a user equipment (UE), execution of the instructions by the one or more processors configuring the eNB to:
  determine which of one of a normal coverage mode and an enhanced coverage (EC) mode the LIE is in;
  after a determination that the UE is in the EC mode; receive a plurality of signals from the UE over a physical uplink control channel (PUCCH) in different subframes, the plurality of signals in the subframes being expected to be repetitions of the same signal in response to determining that the LIE is in the EC mode, wherein when energy is detected in a resource of the PUCCH assigned to a Scheduling Request (SR) from the UE, the energy is initially identified as the SR;
  decode the plurality of signals;
  detect that the signals in at least one of the subframes differs from the signals in another of the subframes; and
  determine that the signals in the at least one of the subframes comprise one overlapping signal of a set of overlapping signals scheduled on the PUCCH.

18. The non-transitory computer-readable storage medium of claim 17, wherein:
  the UE is a Machine Type Communications (MTC) UE restricted to communicate with the eNB over a limited set of subbands of a bandwidth spectrum over which the eNB is able to communicate, and each of the first and second signals is repeated across multiple subframes.

19. The non-transitory computer-readable storage medium of claim 17, wherein execution of the instructions by the one or more processors further configure the eNB to:
  receive the plurality of signals in consecutive subframes, including the at least one of the subframes.

20. The non-transitory computer-readable storage medium of claim 19, wherein execution of the instructions by the one or more processors further configure the eNB to:
  receive the signals in the at least one of the subframes in subframes surrounding the at least one of the subframes.

21. The non-transitory computer-readable storage medium of claim 17, wherein:
  the signals in the at least one of the subframes are received in the at least one of the subframes instead of the signals in the other of the subframes.

22. The non-transitory computer-readable storage medium of claim 21, wherein:
  the signals in the at least one of the subframes comprise an Acknowledgment/Non-acknowledgment (ACK/NACK) and the signals in the other of the subframes comprise the SR.

23. The non-transitory computer-readable storage medium of claim 17, wherein execution of the instructions by the one or more processors further configure the eNB to:
  decode the energy to determine that the information is an Acknowledgment/Non-acknowledgment (ACK/NACK) rather than the scheduling request.

24. The non-transitory computer-readable storage medium of claim 17, wherein execution of the instructions by the one or more processors further configure the eNB to:
  retain information that an Acknowledgment/Non-acknowledgment (ACK/NACK) is scheduled to be transmitted by the UE and determine that a transmission on the resource of the PUCCH is the ACK/NACK that also indicates the presence of the scheduling request.

* * * * *

UNITED STATES PATENT AND TRADEMARK OFFICE
CERTIFICATE OF CORRECTION

Page 1 of 1

PATENT NO. : 9,955,356 B2
APPLICATION NO. : 14/718975
DATED : April 24, 2018
INVENTOR(S) : Xiong et al.

It is certified that error appears in the above-identified patent and that said Letters Patent is hereby corrected as shown below:

In the Claims

In Column 21, Line 20, in Claim 17, delete "LIE" and insert --UE-- therefor

In Column 21, Line 21, in Claim 17, delete "mode;" and insert --mode,-- therefor In Column 21, Line 26, in Claim 17, delete "LIE" and insert --UE-- therefor Signed and Sealed this
Fourth Day of June, 2019

Andrei Iancu
*Director of the United States Patent and Trademark Office*